United States Patent
Qin et al.

(10) Patent No.: US 10,205,357 B2
(45) Date of Patent: Feb. 12, 2019

(54) ELECTRIC MOTOR

(71) Applicant: Johnson Electrica S.A., Murten (CH)

(72) Inventors: Rui Feng Qin, Hong Kong (CN); Di Wang, Shenzhen (CN); Ji Yu Liang, Shenzhen (CN); Guo Dong Ren, Shenzhen (CN); Yong Bin Li, Hong Kong (CN); Xiao Wu Xie, Shenzhen (CN); Yao Zhao, Shenzhen (CN); Xian Ming Wu, Shenzhen (CN); Sheng Han, Shenzhen (CN)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 1253 days.

(21) Appl. No.: 14/303,373

(22) Filed: Jun. 12, 2014

(65) Prior Publication Data

US 2014/0368076 A1    Dec. 18, 2014

(30) Foreign Application Priority Data

Jun. 13, 2013    (CN) .......................... 2013 1 0233805

(51) Int. Cl.
*H02K 1/24* (2006.01)
*H02K 1/26* (2006.01)
*H02K 1/30* (2006.01)

(52) U.S. Cl.
CPC .................. *H02K 1/26* (2013.01); *H02K 1/24* (2013.01); *H02K 1/30* (2013.01)

(58) Field of Classification Search
CPC ............... H02K 1/24; H02K 1/26; H02K 1/30

(Continued)

(56) References Cited

U.S. PATENT DOCUMENTS 2,708,724 A * 5/1955 Martin ..................... H02K 1/26
                                                                310/216.053
5,402,024 A * 3/1995 Watanabe ............ H02K 1/2733
                                                                310/156.12

(Continued)

FOREIGN PATENT DOCUMENTS

| JP | H05292689 A | 11/1993 |
| JP | 2006304427 A | 11/2006 |
| JP | 2009303446 A | 12/2009 |

OTHER PUBLICATIONS

Watanabe et al., English Machine Translation of JP2006304427, Feb. 7, 2013.*

*Primary Examiner* — Bernard Rojas
*Assistant Examiner* — Rashad Johnson
(74) *Attorney, Agent, or Firm* — Muncy, Geissler, Olds & Lowe, P.C.

(57) ABSTRACT

An electric motor includes a stator having multiple magnetic poles and a rotor rotatably mounted to the stator. The rotor includes a shaft, a commutator and a rotor core fixed to the shaft; and windings wound on the rotor core and electrically connected to the commutator. The rotor core is formed by stacking a plurality of laminations. Each lamination includes an inner ring having a hole for fixing the shaft; an outer ring radially spaced from the inner ring; multiple teeth extending outwardly from the outer ring, and multiple ribs connecting the inner ring to the outer ring. Each rib has a width w measured in a circumferential direction of the lamination. The number of ribs is n. The width w and the number n satisfy the formula: $0.75 \leq n \times w^2 \leq 64$, where the width w is measured in millimeters.

25 Claims, 6 Drawing Sheets

(58) Field of Classification Search
USPC ..... 310/216.001–216.005, 216.053–216.054, 310/216.057, 91
See application file for complete search history.

(56) References Cited

U.S. PATENT DOCUMENTS

| | | | | |
|---|---|---|---|---|
| 6,006,418 | A | * 12/1999 | Takeda | H02K 1/278 29/598 |
| 2004/0066109 | A1 | * 4/2004 | Fujinaka | H02K 21/22 310/216.096 |
| 2015/0084469 | A1 | * 3/2015 | Yazaki | H02K 1/276 310/156.53 |

* cited by examiner

ELECTRIC MOTOR

CROSS REFERENCE TO RELATED APPLICATIONS

This non-provisional patent application claims priority under 35 U.S.C. § 119(a) from Patent Application No. 201310233805.6 filed in The People's Republic of China on Jun. 13, 2013, the entire contents of which are hereby incorporated by reference.

FIELD OF THE INVENTION

This invention relates to an electric motor, and in particular to laminations forming a rotor core of the electric motor.

BACKGROUND OF THE INVENTION

An electric motor typically includes a stator and a rotor rotatable with respect to the stator. The stator has multiple magnetic poles that are typically formed by permanent magnets. The rotor includes a shaft with a rotor core and a commutator fixed thereon. The rotor core has multiple teeth and rotor windings wound about the teeth. The windings are electrically connected to the commutator. Brushes are provided to slidably contact the commutator to feed electricity to the windings, and therefore power the motor.

A typical rotor core is formed by stacking a plurality of laminations that have an annular portion with a central hole into which the shaft is pressed. The teeth extend from a radially outer circumference of the annular portion. Motors having this type of rotor core have a disadvantage that torque ripple generated at the teeth due to the interaction with the stator is transferred to the shaft and then to the driven device, such as a fan or the like. As a result, undesirable noise is generated by the torque ripple.

Therefore, there is a desire for an improved motor that can overcome the above described shortcomings or at least provide a useful choice.

SUMMARY OF THE INVENTION

Accordingly, in one aspect thereof, the present invention provides an electric motor comprising: a stator having a plurality of magnetic poles; and a rotor rotatably mounted to the stator, the rotor comprising: a shaft; a commutator fixed to the shaft; a rotor core comprising a stack of laminations fixed to the shaft and located adjacent to the commutator; and rotor windings wound on the rotor core and electrically connected to the commutator, wherein each lamination comprises: an inner ring having a hole for fixing the shaft; an outer ring radially spaced from the inner ring; a plurality of teeth extending outwardly from the outer ring; and a number of ribs connecting the inner ring to the outer ring, each rib having a width w measured in a circumferential direction of the lamination; wherein the number of ribs is n, the width w and the number n satisfy the formula: $0.75 \leq n \times w^2 \leq 64$, where the width w of each rib is measured in millimeters.

Preferably, the number n and the width w satisfy the formula: $6.75 \leq n \times w^2 \leq 18$.

Preferably, n is three and w is 2.0 mm.
Alternatively, n is three or four and w is 1.5 mm.
Alternatively, n is three and w is 0.65 mm.
Alternatively, n is four, and w is 4 mm.
Preferably, w is in the range of 0.60 mm to 4 mm.

Preferably, each rib extends radially from the inner ring to the outer ring.

Alternatively, each rib extends in a non-radial direction.
Preferably, each rib is inclined with respect to a radial direction crossing a radially inner end of the rib.

Alternatively, each rib extends along a curved path from the inner ring to the outer ring.

Preferably, each rib is substantially S shaped.
Preferably, the ribs are arranged asymmetrically with respect to the rotational center of the lamination.

Preferably, each rib has a radially outer end, the radially outer ends of two adjacent ribs are angularly spaced from each other by a central angle, and the central angles between radially outer ends of different adjacent ribs are different.

Preferably, the central angle between radially outer ends of two adjacent ribs is between 66° to 78°.

Preferably, an average central angle is defined as 360°/n; and a difference value between the average central angle and the central angle between radially outer ends of each two adjacent ribs is in the range of 0° to 6°.

Preferably, the width w is in the range of 1.0 mm-3.0 mm.

In another aspect thereof, the present invention provides a lamination for an electric motor, comprising: an inner ring having a hole for fixing a shaft; an outer ring radially spaced from the inner ring; a plurality of teeth extending outwardly from the outer ring; and a plurality of ribs connecting the inner ring to the outer ring, each rib having a width w measured in a circumferential direction of the lamination; wherein the number of ribs is n, the width w and the number n satisfy the formula: $0.75 \leq n \times w^2 \leq 64$, wherein the width w is measured in millimeters.

Preferably, the number n and the width w satisfy the formula: $6.75 \leq n \times w^2 \leq 18$.

Preferably, the number of ribs is three and the width of each rib is 2.0 mm.

Preferably, each rib extends in a non-radial direction.
Preferably, each rib extends along a curved path from the inner ring to the outer ring.

Preferably, the ribs are arranged asymmetrically with respect to the rotational center of the lamination.

Preferably, each rib has a radially outer end, the radially outer ends of two adjacent ribs are angularly spaced from each other by a central angle, and the central angles between radially outer ends of different adjacent ribs are different.

Preferably, an average central angle is defined as 360° divided by n, wherein n is the number of ribs; and a difference value between the average central angle and the central angle between radially outer ends of each two adjacent ribs is in the range of 0° to 6°.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
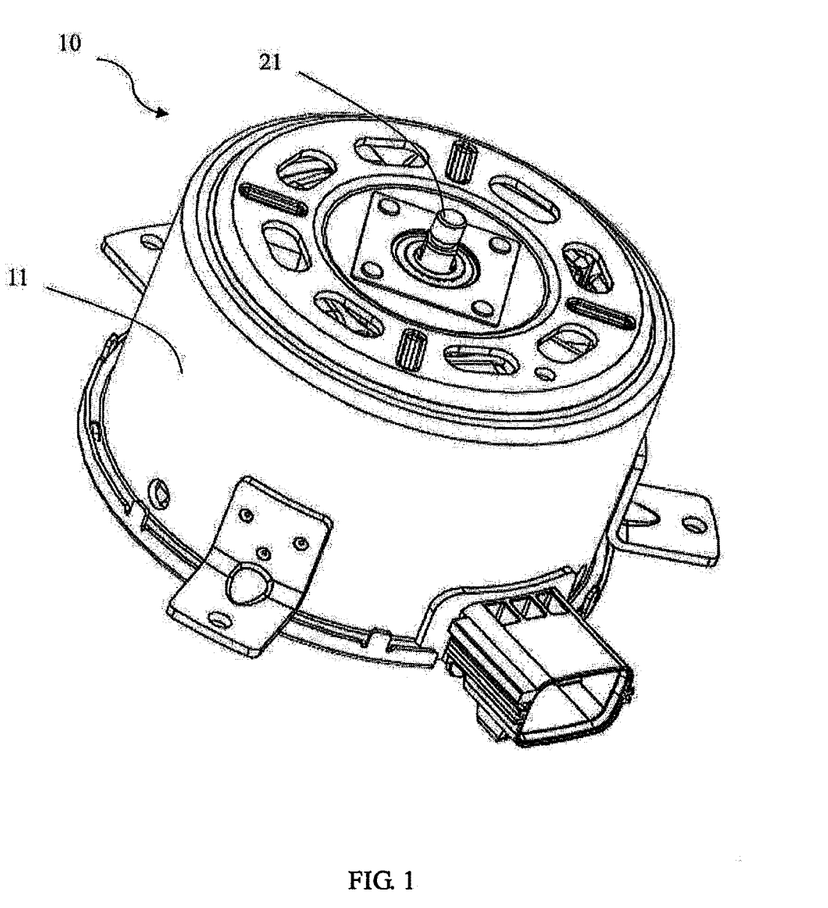
FIG. 1 is an isometric view of a motor according to a first embodiment of the present invention.
Figure 2:
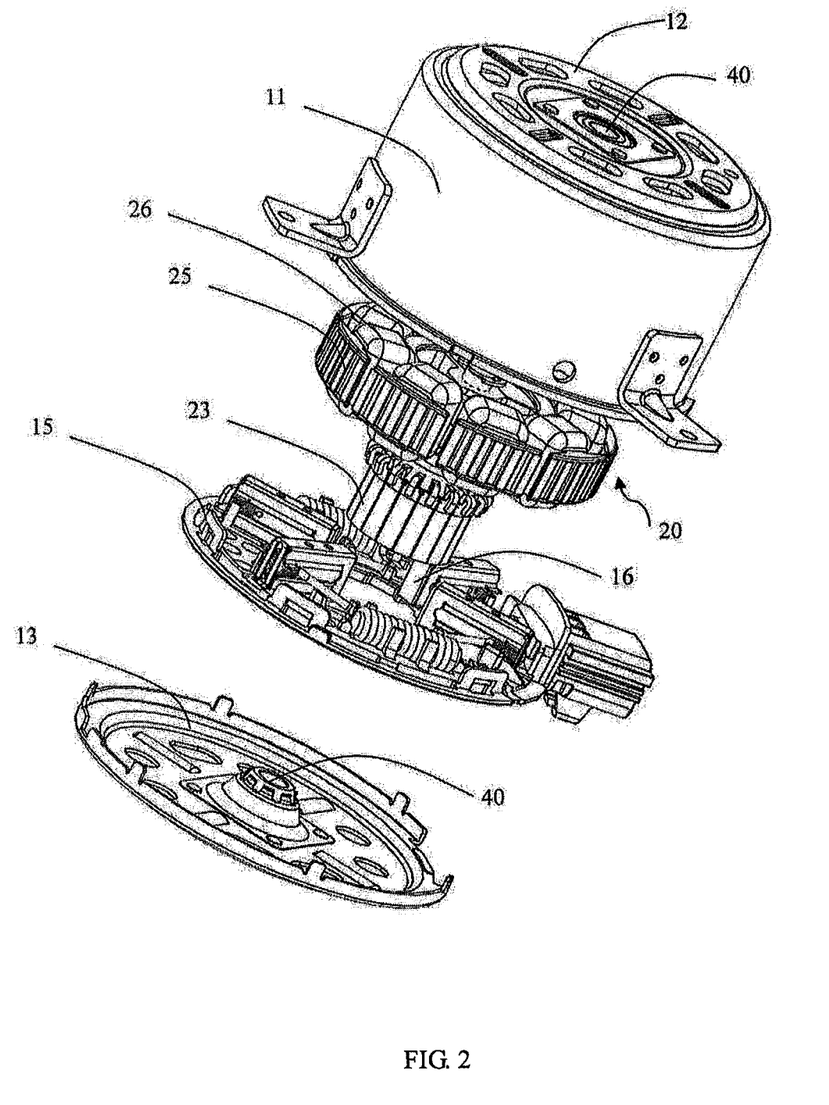
FIG. 2 is an exploded view of the motor of FIG. 1.
Figure 3:
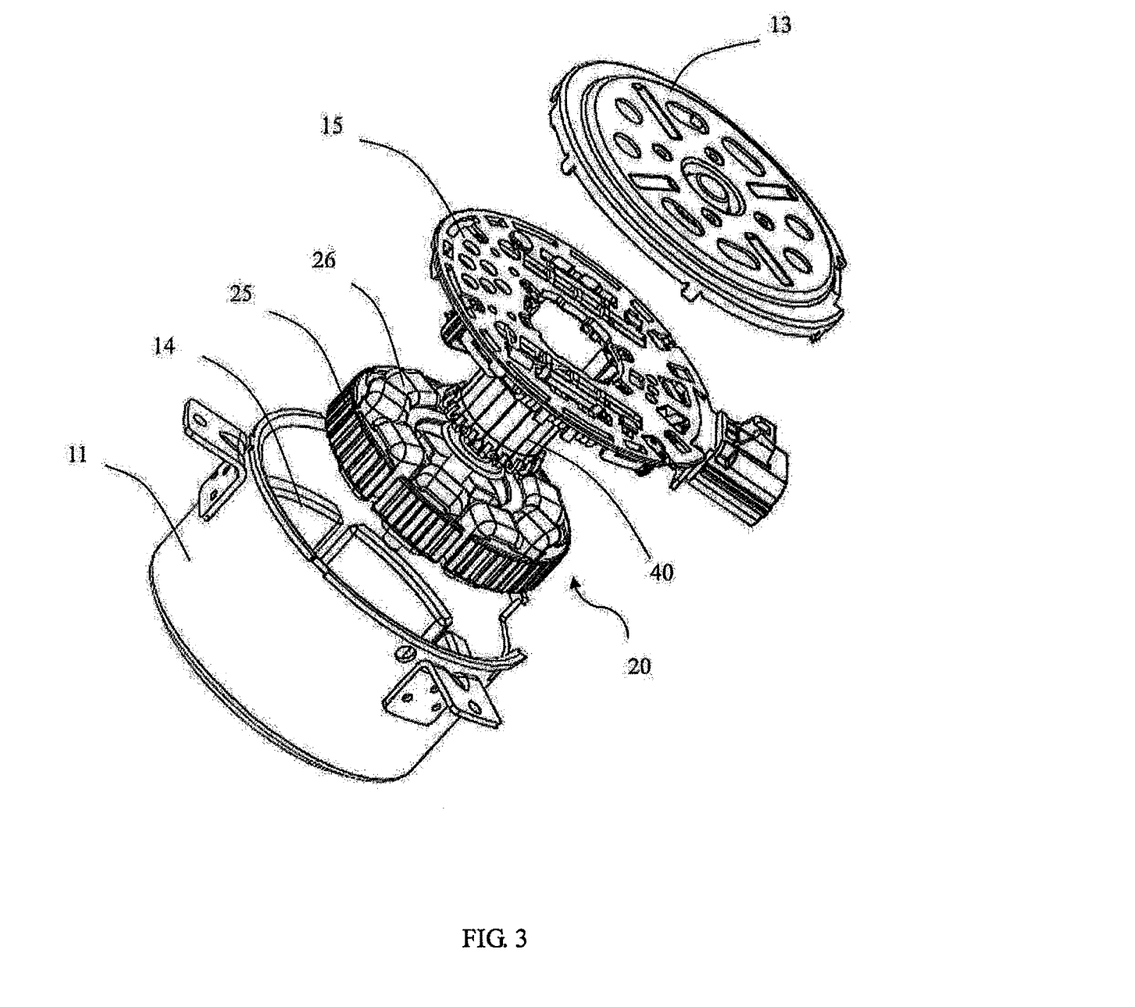
FIG. 3 is a view similar to FIG. 2, but viewed from below.

FIGS. 1 through 3 show a motor 10 according to the preferred embodiment of the present invention that can be used in, for example, a cooling fan module for an engine or the like.

The motor 10 includes a stator and a rotor 20 rotatably received in the stator. The stator has a cylindrical housing 11 having an open end and a closed end, a plurality of permanent magnets 14 attached to an inner circumferential wall of the housing 11, a brush card 15 attached to the open end of the housing 11, and an end cap 13 fixed to the housing 11 at the open end. The brush card 15 is located in the cavity defined by the housing 11 and the end cap 13. The brush card 15 includes a plurality of brushes 16 mounted thereon. The brushes 16 are arranged to be electrically connected to a power source to receive power therefrom.

The closed end of the housing 11 forms an end cover 12. Two bearings 40 are respectively mounted on the end cover 12 of the housing 11 and the end cap 13 for rotatably supporting the rotor 20.

The rotor includes a shaft 21 journalled in the two bearings 40, a rotor core 25 and a commutator 23 fixed to the shaft 21. Windings 26 are wound on the rotor core 25 and electrically connected to the commutator 23. The brushes 16 slidably contact the commutator 23 to feed power to the windings 26, and the rotor core 25 magnetized by the energized windings 26 interacts with the magnetic poles of the stator. As such, the magnetic force generated between the stator and the rotor core 25 causes the rotor to rotate with respect to the stator.

The rotor core 25 is formed by stacking a plurality of laminations 30 in an axial direction of the shaft 21. Since the laminations 30 are identical, only one lamination 30 is described below for illustration.

Figure 4:
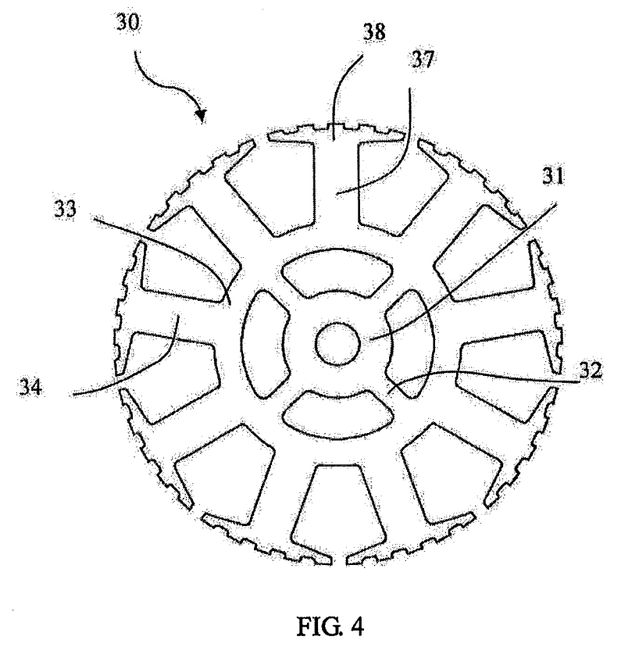
FIG. 4 shows a lamination of the rotor core of the motor of FIG. 2.

Referring to FIG. 4, the lamination 30 is substantially in the form of a flat plate or sheet, having an inner ring 31, an outer ring 33 concentric with the inner ring 31, a plurality of ribs 32 connecting the inner ring 31 to the outer ring 33, and a plurality of teeth 34 extending outwardly from the outer ring 33. The inner ring 31 has a hole 35 for fixing the shaft 21. Each tooth 34 has a neck 37 extending from the outer ring 33 and a pole shoe 38 adjoining a radially outer end of the neck 37 and facing the permanent magnets of the stator. In the present embodiment, each rib 32 substantially extends in a radial direction of the lamination 30.

Each rib, connected between the inner ring 31 and the outer ring 33, has a width smaller than a width of the neck 37 of each tooth 34. The ribs 32 having a small width reduce paths for the torque ripple to transfer from the outer ring 33 to the inner ring 31, then to the shaft 21 and the device driven by the shaft 21. The ribs 32 have a degree of flexibility, resilience or elasticity which dampens the transfer or transmission of vibrations in the outer ring 33 caused by the torque ripple to the inner ring 31. As such, noise generated by the torque ripple can be reduced.

Preferably, the width w of each rib 32 and the number n of the ribs 32 satisfy the formula: $0.75 \leq n \times w^2 \leq 64$, wherein the width w of each rib 32 is measured in millimeters (mm). In this embodiment, the number n of the ribs 32 is four, and the width w of each rib 32 is 4 mm. As such, the ribs 32 with small width can reduce torque ripple transferred from the outer ring 33 to the inner ring 31 while providing enough mechanical strength. In practice, the ribs 32 may have a smaller width, and the number of ribs 32 may be less to reduce further the torque ripple transferred to the shaft 21. More preferably, the width w of each rib 32 and the number n of the ribs 32 satisfy the formula: $6.75 \leq n \times w^2 \leq 18$.

It should be pointed out that, in the description and claims of the present application, the width w of the rib, and the width of the neck 37 of the tooth 34 are both measured in a circumferential direction of the rotor core 25.

Figure 5:
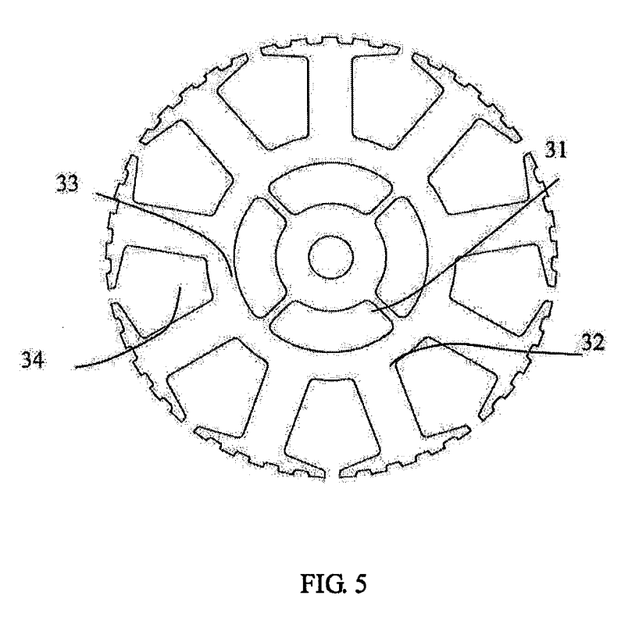
FIG. 5 shows a lamination according to a second embodiment.

FIG. 5 shows a lamination 30 according to a second embodiment of the present invention. In this lamination 30, each rib 32 has a smaller width than that of the first embodiment. Particularly, in this embodiment, the width w of each rib 32 is 1.5 mm.

Figure 6:
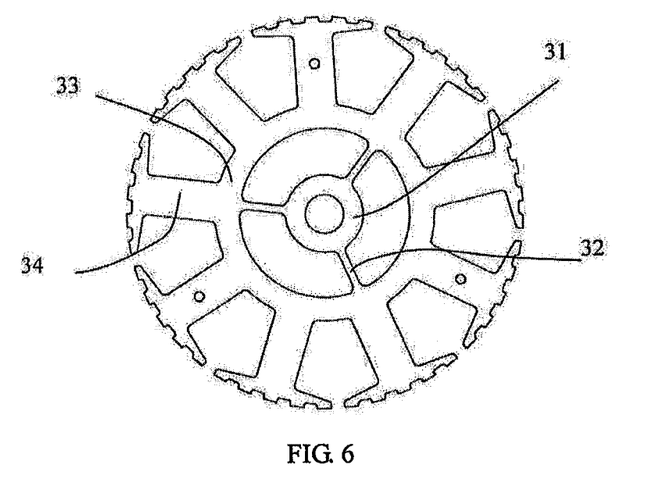
FIG. 6 shows a lamination according to third embodiment.

FIG. 6 shows a lamination 30 according to a third embodiment of the present invention. Compared with the lamination 30 of the second embodiment, the number of ribs 32 in this lamination 30 is reduced to three, and each rib 32 has an even smaller width w, which is 0.65 mm. Alternatively, the width w of the ribs 32 can be larger, such as 1.5 mm, or 2.0 mm, to increase the mechanical strength of the lamination 30 according to practical requirement.

It has been determined that ribs 32 having a width in the range of 0.60 mm to 4 mm has advantages in reducing torque ripple transferred to the shaft 21 and the noise generated by the torque ripple. The number of ribs 32 can be more than three, according to practical requirement.

Figure 7:
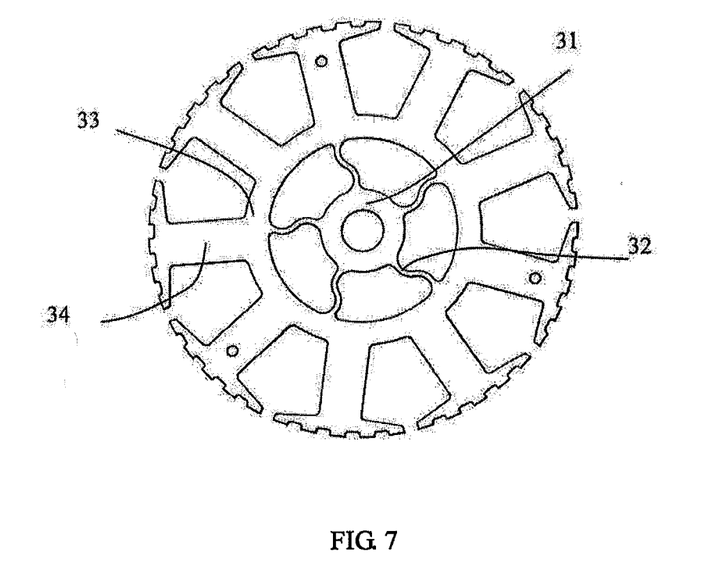
FIG. 7 shows a lamination according to fourth embodiment.

FIG. 7 shows a lamination 30 according to a fourth embodiment of the present invention. In this lamination 30, the number of ribs 32 is five, and each rib 32 extends curvedly rather than linearly. Specifically, each rib 32 is substantially S shaped. As the curved ribs 32 function as a damper, they are more effective in reducing the torque ripple transferred to the shaft 21. In this embodiment, the ribs 32 are symmetric with respect to the rotational center of the lamination 30. Namely, when the lamination 30 is rotated by a predetermined angle to move one rib 32 to the location of a pre-rotated adjacent rib, each rib 32 coincides with a respective pre-rotated adjacent rib. More specifically, all ribs are identical and equally spaced circumferentially about the outer ring.

Figure 8:
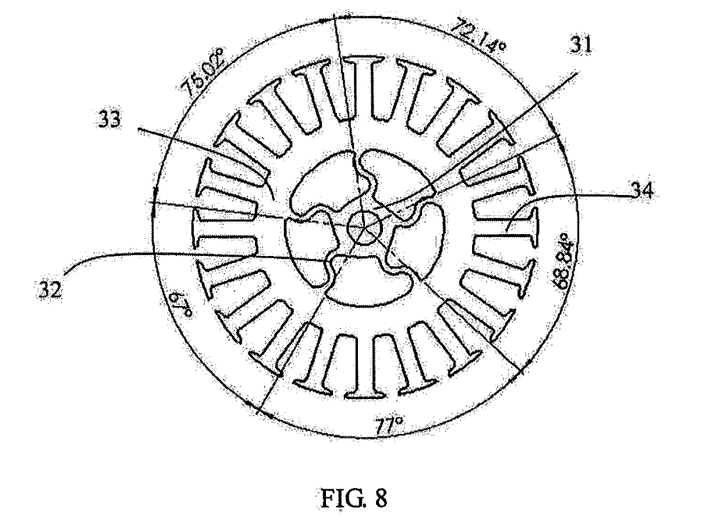
FIG. 8 shows a lamination according to fifth embodiment.

FIG. 8 shows a lamination 30 according to a fifth embodiment of the present invention. This lamination 30, similar to the lamination 30 shown in FIG. 7, has five S shaped ribs 32 with small width. The lamination 30 differs from the lamination 30 shown in FIG. 7 in that the ribs 32 are arranged asymmetrically with respect to the rotational center of the lamination 30. Specifically, each rib 32 has a radially outer end and the radially outer ends of two adjacent ribs 32 are angularly spaced from each other by a central angle, which is preferably between 66° to 78°. The central angles between the radially outer ends of different adjacent ribs 32 are different. For example, in this embodiment, the five central angles between the radially outer ends of the ribs 32 are respectively, 75.02°, 72.14°, 68.84°, 77° and 67°.

Figure 9:
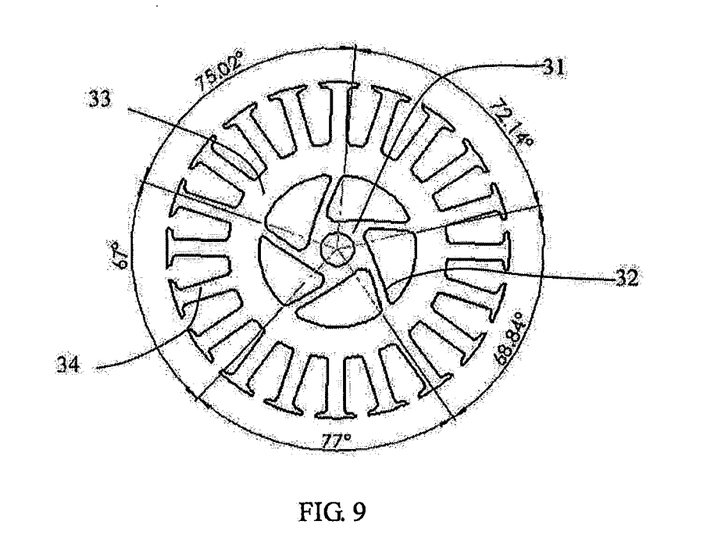
FIG. 9 shows a lamination according to sixth embodiment.

FIG. 9 shows a lamination 30 according to a sixth embodiment of the present invention. This lamination 30, similar to the lamination 30 shown in FIG. 8, has five ribs 32 with small width that are arranged asymmetrically with respect to the rotational center of the lamination 30. The central angles between the radially outer ends of different adjacent ribs 32 are different. In this embodiment, the five angles between the radially outer ends of the ribs 32 are respectively, 75.02°, 72.14°, 68.84°, 77° and 67°. This lamination 30 differs from the lamination 30 shown in FIG. 8 in that each rib 32 extends linearly rather than curvedly. Also, the ribs 32 are inclined with respect to radial directions of the lamination 30. Namely, each rib 32 is inclined clockwise with respect to a radial direction that crosses the radially inner end of the rib.

Since the ribs 32 of the laminations 30 shown in FIGS. 8 and 9 are arranged asymmetrically, this changes the resonance frequency of the lamination 30, and thus further reduces the torque ripple transferred to the shaft 21. Preferably, the width w of the ribs 32 is in the range of 1.0 mm to 3.0 mm. The number n of ribs 32 may be more than 5, but preferably not more than 13. A difference value between an average central angle, defined as 360°/n, and the central angle between the radially outer ends of each two adjacent ribs 32 is in the range of 0° to 6°.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric motor comprising:
a stator having a plurality of magnetic poles; and
a rotor rotatably mounted to the stator, the rotor comprising:
a shaft;
a commutator fixed to the shaft;
a rotor core comprising a stack of laminations fixed to the shaft and located adjacent to the commutator; and
rotor windings wound on the rotor core and electrically connected to the commutator,
wherein each lamination comprises:
an inner ring having a hole for fixing the shaft;
an outer ring radially spaced from the inner ring;
a plurality of teeth extending outwardly from the outer ring; and
a number of ribs connecting the inner ring to the outer ring, each rib having a width w measured in a circumferential direction of the lamination;
wherein the number of ribs is n, the width w and the number n satisfy the formula: $0.75 \leq n \times w^2 \leq 64$, where the width w of each rib is measured in millimeters, reducing the harshness of the electric motor.

2. The motor of claim 1, wherein the number n and the width w satisfy the formula: $6.75 \leq n \times w^2 \leq 18$.

3. The motor of claim 1, wherein n is three and w is 2.0 mm.

4. The motor of claim 1, wherein n is three or four and w is 1.5 mm.

5. The motor of claim 1, wherein n is three and w is 0.65 mm.

6. The motor of claim 1, wherein n is four, and w is 4 mm.

7. The motor of claim 1, wherein w is in the range of 0.60 mm-4 mm.

8. The motor of claim 1, wherein each rib extends radially from the inner ring to the outer ring.

9. The motor of claim 1, wherein each rib extends in a non-radial direction.

10. The motor of claim 9, wherein each rib is inclined with respect to a radial direction crossing a radially inner end of the rib.

11. The motor of claim 9, wherein each rib extends along a curved path from the inner ring to the outer ring.

12. The motor of claim 11, wherein each rib is substantially S shaped.

13. The motor of claim 9, wherein the ribs are arranged asymmetrically with respect to the rotational center of the lamination.

14. The motor of claim 13, wherein each rib has a radially outer end, the radially outer ends of two adjacent ribs are angularly spaced from each other by a central angle, and the central angles between radially outer ends of different adjacent ribs are different.

15. The motor of claim 14, wherein the central angle between radially outer ends of two adjacent ribs is between 66° to 78°.

16. The motor of claim 14, wherein an average central angle is defined as 360°/n; and
a difference value between the average central angle and the central angle between radially outer ends of each two adjacent ribs is in the range of 0° to 6°.

17. The motor of claim 9, wherein the width w is in the range of 1.0 mm to 3.0 mm.

18. A lamination for an electric motor, comprising:
an inner ring having a hole for fixing a shaft;
an outer ring radially spaced from the inner ring;
a plurality of teeth extending outwardly from the outer ring; and
a plurality of ribs connecting the inner ring to the outer ring, each rib having a width w measured in a circumferential direction of the lamination;
wherein the number of ribs is n, the width w and the number n satisfy the formula: $0.75 \leq n \times w^2 \leq 64$, wherein the width w is measured in millimeters, reducing the harshness of the electric motor.

19. The lamination of claim 18, wherein the number n and the width w satisfy the formula: $6.75 \leq n \times w^2 \leq 18$.

20. The lamination of claim 18, wherein the number of ribs is three and the width of each rib is 2.0 mm.

21. The lamination of claim 18, wherein each rib extends in a non-radial direction.

22. The lamination of claim 18, wherein each rib extends along a curved path from the inner ring to the outer ring.

23. The lamination of claim 18, wherein the ribs are arranged asymmetrically with respect to the rotational center of the lamination.

24. The lamination of claim 23, wherein each rib has a radially outer end, the radially outer ends of two adjacent ribs are angularly spaced from each other by a central angle, and the central angles between radially outer ends of different adjacent ribs are different.

25. The lamination of claim 24, wherein an average central angle is defined as 360° divided by n, wherein n is the number of ribs; and
a difference value between the average central angle and the central angle between radially outer ends of each two adjacent ribs is in the range of 0° to 6°.

* * * * *